(12) United States Patent
Fries et al.

(10) Patent No.: US 7,104,160 B2
(45) Date of Patent: Sep. 12, 2006

(54) METHOD OF MAKING A CUTTING TOOL

(76) Inventors: Robert Fries, 4 Birnam Road, Forest Town, Johannesburg (ZA) 2193; Iakovos Sigalas, 112 3rd Street, Linden (ZA) 2195

( * ) Notice: Subject to any disclaimer, the term of this patent is extended or adjusted under 35 U.S.C. 154(b) by 193 days.

(21) Appl. No.: 10/451,063

(22) PCT Filed: Dec. 18, 2001

(86) PCT No.: PCT/IB01/02553

§ 371 (c)(1),
(2), (4) Date: Dec. 29, 2003

(87) PCT Pub. No.: WO02/49801

PCT Pub. Date: Jun. 27, 2002

(65) Prior Publication Data

US 2004/0093989 A1    May 20, 2004

(30) Foreign Application Priority Data

Dec. 21, 2000    (ZA) .................................. 2000/7772

(51) Int. Cl.
*B21K 5/04* (2006.01)

(52) U.S. Cl. ............................... 76/108.1; 76/DIG. 11; 76/DIG. 12

(58) Field of Classification Search ............... 76/108.1, 76/108.6, DIG. 11, DIG. 12; 408/144, 199; 407/30, 32, 53, 56, 61, 62, 63, 118, 119; 51/307, 51/309
See application file for complete search history.

(56) References Cited

U.S. PATENT DOCUMENTS

| | | | |
|---|---|---|---|
| 4,762,445 A * | 8/1988 | Bunting et al. ............. 408/144 |
| 4,797,241 A * | 1/1989 | Peterson et al. ............... 51/307 |
| 4,813,823 A | 3/1989 | Bieneck |
| 4,991,467 A * | 2/1991 | Packer ...................... 76/108.6 |
| 5,031,484 A | 7/1991 | Packer |
| 5,070,748 A * | 12/1991 | Packer ...................... 76/108.6 |
| 5,115,697 A * | 5/1992 | Rodriguez et al. ......... 76/108.6 |
| 5,611,251 A * | 3/1997 | Katayama .................. 76/108.6 |
| 5,762,538 A * | 6/1998 | Shaffer ....................... 76/108.6 |
| 5,979,578 A * | 11/1999 | Packer ....................... 175/432 |
| 6,029,544 A * | 2/2000 | Katayama .................. 76/108.6 |
| 6,182,533 B1* | 2/2001 | Tank ......................... 76/108.1 |

FOREIGN PATENT DOCUMENTS

| | | |
|---|---|---|
| DE | 36 20 115 | 12/1987 |
| EP | 0 238 477 | 9/1987 |
| JP | 62 034710 | 2/1987 |
| JP | 03 073210 | 3/1991 |
| JP | 04 083806 | 3/1992 |
| WO | WO 93/02823 | 2/1993 |

* cited by examiner

*Primary Examiner*—Timothy V. Eley
*Assistant Examiner*—Jason Prone
(74) *Attorney, Agent, or Firm*—Oblon, Spivak, McClelland, Maier & Neustadt, P.C.

(57) ABSTRACT

A method for producing a cutting tool such a twist grill, end mill, or the like. The method provides an unbonded assembly including a cylindrical core having ends and an elongate side surface covered partially or completely by a coherent, unsintered layer including ultra-hard abrasive particles for producing an ultra-hard material. The unbonded assembly is subjected to elevated temperature and pressure conditions at which the ultra-hard abrasive is crystographically stable. The sintered product is then recovered that includes a cylindrical core and a layer of ultra-hard abrasive material bonded to the core, and the sintered product is worked to produce one or more cutting edges in the layer of ultra-hard abrasive material.

7 Claims, 1 Drawing Sheet

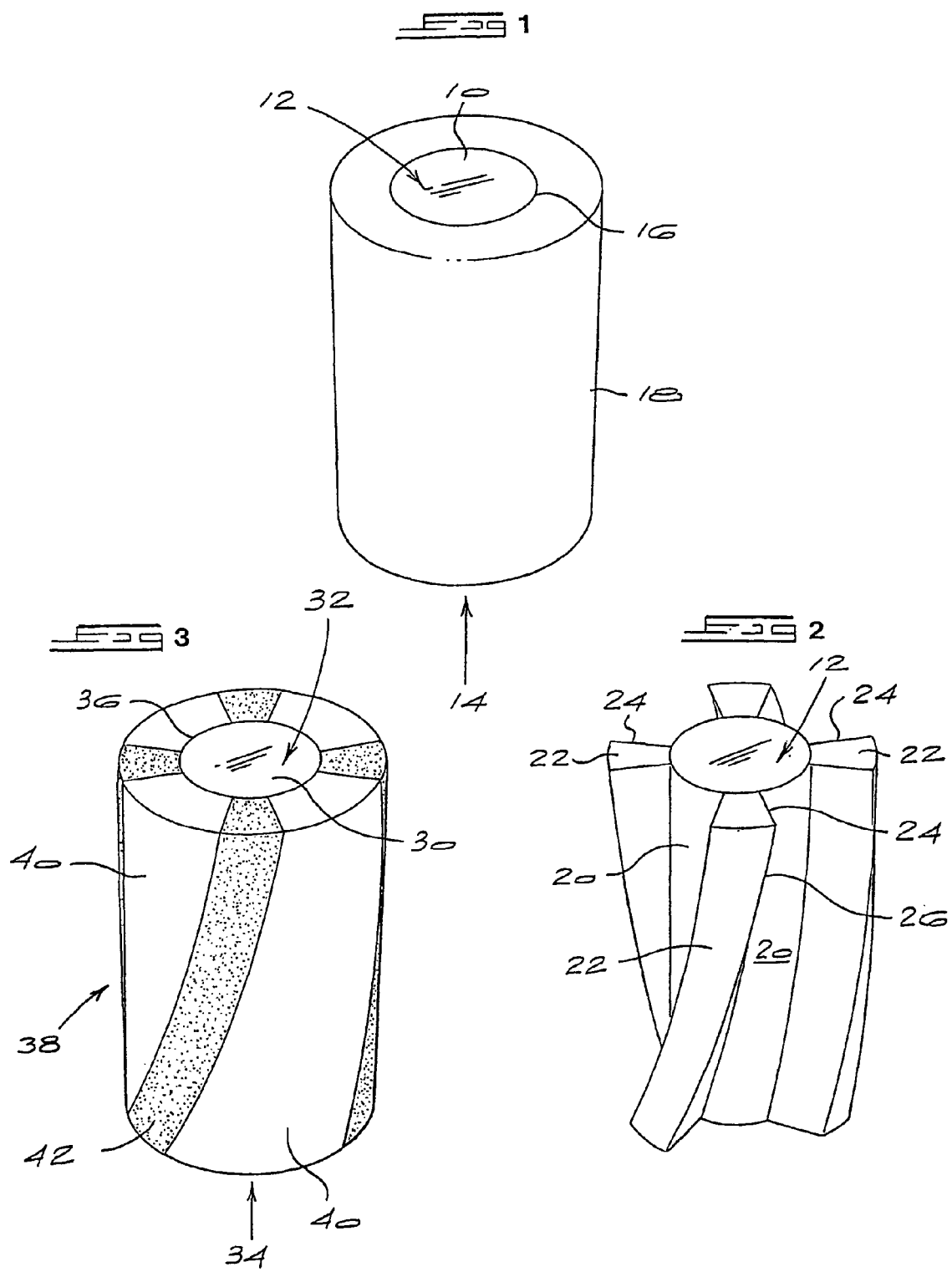

METHOD OF MAKING A CUTTING TOOL

BACKGROUND OF THE INVENTION

1. Field of the Invention

This invention relates to a method of making a cutting tool.

2. Discussion of the Background

Cutting tools such as end mills are provided with a helically fluted working end. The helical flutes provide cutting edges for the tool. These cutting edges may be provided by abrasive compact which will typically be diamond or cubic boron nitride abrasive compact. Diamond abrasive compact is also known as PCD. Cubic boron nitride compact, is also known as PCBN.

Many methods are known in the art to produce the helical flutes of cutting tools with abrasive compact cutting edges. For example, U.S. Pat. No. 5,031,484 discloses a method of producing an end mill in which helical grooves are produced in a tool blank, the grooves are filled with a mixture of diamond powder and cobalt and then the blank subjected to elevated temperature and pressure conditions at which the diamond is crystallographically stable. Under these conditions, the diamond and cobalt form PCD in the groove and this PCD is bonded to the blank. A disadvantage of this method is that sintering of PCD or PCBN into a groove of a pre-sintered blank results in severe differential shrinkage between the PCD or PCBN phase and the pre-sintered blank. Therefore, the depth and possible geometries of the grooves are limited.

It is also possible to braze strips of PCD or PCBN to the helically fluted ends of such tools. Brazing, however, introduces weaknesses and severely limits the geometries possible.

SUMMARY OF THE INVENTION

According to the present invention, a method of producing a cutting tool includes the steps of providing an unbonded assembly comprising a cylindrical core having ends and an elongate side surface covered partially or completely by a coherent, unsintered layer, the layer comprising ultra-hard abrasive particles suitable for producing an ultra-hard material, subjecting the unbonded assembly to elevated temperature and pressure conditions at which the ultra-hard abrasive is crystallographically stable, recovering the sintered product which comprises a cylindrical core and an ultra-hard abrasive material bonded to the core, and working the sintered product to produce one or more cutting edges in the ultra-hard abrasive material.

The layer covering at least part of the elongate side surface is coherent and unsintered, i.e. a green state layer. It is coherent in the sense that it will hold its shape on the surface and is unsintered in the sense that it has not been subjected to the type of elevated temperature and pressure to which the unbonded assembly is subjected. Generally the layer will comprise particles bonded by means of a binder such as an organic binder. An example of a suitable organic binder is methyl cellulose.

In one form of the invention, the layer is one of ultra-hard abrasive particles, alone or together with a solvent/catalyst for the particles, which covers the entire elongate side surface of the core. The sintered product which is produced comprises a cylindrical core and an ultra-hard material bonded to the core and covering the entire elongate side surface thereof. Cutting edges are produced by removing some of the ultra-hard material. Preferably, the removal is such as to produce two or more spaced ultra-hard material regions, each presenting at least one cutting edge which is preferably curved, helical or twisted.

In another form of the invention, the layer comprises the components suitable to produce the same material as the core and includes one or more veins of ultra-hard abrasive particles suitable to produce the ultra-hard material. The veins will preferably extend longitudinally from one end of the core to the other and may define a curved, helical or twisted configuration. One or more cutting edges of ultra-hard material are produced by removing at least some of the core material from the sintered layer in the sintered product.

The ultra-hard material will generally be PCD or PCBN. To produce such a material, the ultra-hard abrasive particles will be diamond particles or cubic boron nitride particles, alone or preferably together with a suitable solvent/catalyst in particulate form.

The ultra-hard material may also be a cemented carbide having dispersed therein discrete ultra-hard abrasive particles such as diamond or cubic boron nitride. To produce such a material, a particulate mixture of carbide particles, a metal binder and the ultra-hard abrasive particles will be made and form the coherent, unsintered layer.

The core will typically be a material such as cemented carbide or steel which may be in sintered form, or in unsintered form, prior to the application of the elevated temperature and pressure conditions.

BRIEF DESCRIPTION OF THE DRAWINGS

FIGS. 1 and 2 are perspective views of a first embodiment of the invention; and FIG. 3 is a perspective view of a second embodiment of the invention.

DESCRIPTION OF THE PREFERRED EMBODIMENTS

A first embodiment of the invention is illustrated by FIGS. 1 and 2. Referring to FIG. 1, there is shown an unbonded assembly for use in making a cutting tool. The assembly comprises a core 10 having flat end surfaces 12, 14 and an elongate curved side surface 16. The entire side surface 16 is covered by a layer 18.

The core 10 is typically made of cemented carbide such as cemented tungsten carbide or steel. The core 10 may be in sintered or unsintered form.

The layer 18 is a green state layer which is coherent and unsintered, i.e. it has not been subjected to elevated temperature and pressure conditions. It comprises ultra-hard abrasive particles necessary to make an ultra-hard material. The abrasive particles may be mixed with other particles, e.g. particles of a suitable solvent/catalyst. The particles are bonded into coherent form by a binder such as an organic binder. An example of a suitable organic binder is methyl cellulose.

The unbonded assembly is then placed in the reaction capsule of a conventional high temperature/high pressure apparatus. Material such as salt may be used to pack the assembly in the capsule. The capsule is placed in a reaction zone of the apparatus and subjected to the elevated temperature and pressure conditions at which the ultra-hard abrasive is crystallographically stable. The preferred ultra-hard abrasive is diamond. In this case, the elevated temperature will typically be in the range 1400 to 1700° C. and the elevated pressure in the range 4 to 7 GPa. Under these conditions, the layer 18, now sintered and bonded to the core, will be PCD. To produce the PCD, it is preferred that the diamond particles are mixed with cobalt or other diamond solvent/catalyst, in particulate form.

If the core 10 is in unsintered form prior to insertion of the unbonded assembly into the reaction capsule, then sintering of the core takes place on the application of the elevated temperature and pressure conditions.

The sintered product is removed from the capsule using conventional and known techniques. The sintered product has an outer sintered layer of ultra-hard material, e.g. PCD, firmly bonded to the core. The sintered product will have the same shape as the unsintered product of FIG. 1 with the sintered ultra-hard material being layer 18. Twisted or helical grooves 20 may then be formed in the sintered layer 18 by cutting, grinding or the like, as shown in FIG. 2. This in turn results in flutes 22 of ultra-hard material being produced. The edges 24, 26 of the flutes 22 provide cutting edges for the tool.

A second embodiment of the invention is illustrated by FIG. 3. Referring to this figure, an unbonded assembly for use in making a cutting tool comprises a core 30 having flat ends 32, 34 and an elongate curved side surface 36. The entire side surface 36 is covered by a layer 38.

The core 30 is typically made of cemented carbide such as cemented tungsten carbide or steel. The core 30 may be sintered or unsintered in form.

The layer 38 is a green state layer and is coherent and unsintered, i.e. it has not been subjected to elevated temperature and pressure conditions. The layer 38 comprises two regions, 40 and 42. The region 40 comprises the components necessary to make the same material as that of the core. These components will be bonded into coherent form by a binder of the type described above. The second region 42 comprises the ultra-hard abrasive particles necessary to produce the ultra-hard material.

The unbonded assembly is placed in the reaction capsule of a conventional high temperature/high pressure apparatus. Material such as salt may be used to pack the assembly In the capsule. The capsule is placed in a reaction zone of the apparatus and subjected to elevated temperature and pressure conditions at which the ultra-hard abrasive particles are crystallographically stable. These conditions are such as to cause the components in region 40 to sinter and in region 42 to sinter and produce the ultra-hard material. If the core 30 is in unsintered form, sintering of the core takes place simultaneously.

The sintered product is removed from the capsule using conventional and known techniques. The sintered product will have the same shape as that shown by FIG. 3 with the sintered outer layer comprising the two sintered regions 40, 42 firmly bonded to the core and to each other. Helical flutes are created by removing the sintered regions 40 between successive regions 42, e.g. by grinding. The product which results is essentially the same as that illustrated by FIG. 2.

The invention has particular application to cutting tools such as twist drills, end mills and the like.

The invention claim is:

1. A method of producing a cutting tool comprising:
   providing an unbonded assembly comprising a cylindrical core having ends and an elongate side surface covered partially or completely by a coherent, unsintered layer, the layer comprising ultra-hard abrasive particles for producing an ultra-hard abrasive material;
   subjecting the unbonded assembly to elevated temperature and pressure conditions at which the ultra-hard abrasive material is crystallographically stable;
   recovering the sintered product which comprises a cylindrical core and an ultra-hard abrasive material bonded to the core; and
   working the sintered product to produce one or more cutting edges in the ultra-hard abrasive material wherein the layer comprises components suitable to produce the same material as the core and includes one or more veins of ultra-hard abrasive particles for producing the ultra-hard abrasive material, and one or more cutting edges are produced by removing at least some of the core material from the sintered layer in the sintered product.

2. A method according to claim 1 wherein the one or more cutting edges extend from one end of the core to the other end.

3. A method according to claim 1 wherein one or more cutting edges are curved, helical or twisted.

4. A method according to claim 1 wherein the one or more veins extend longitudinally from one end of the core to the other end.

5. A method according to claim 1 wherein the one or more veins define a curved, helical or twisted configuration.

6. A method according to claim 1 wherein the core material is cemented carbide or steel.

7. A method according to claim 1 wherein the ultra-hard abrasive material is PCD or PDBN.

* * * * *